July 14, 1959 R. ROSEN 2,894,811
PROCESS FOR MAKING URANIUM HEXAFLUORIDE
Filed Sept. 13, 1944
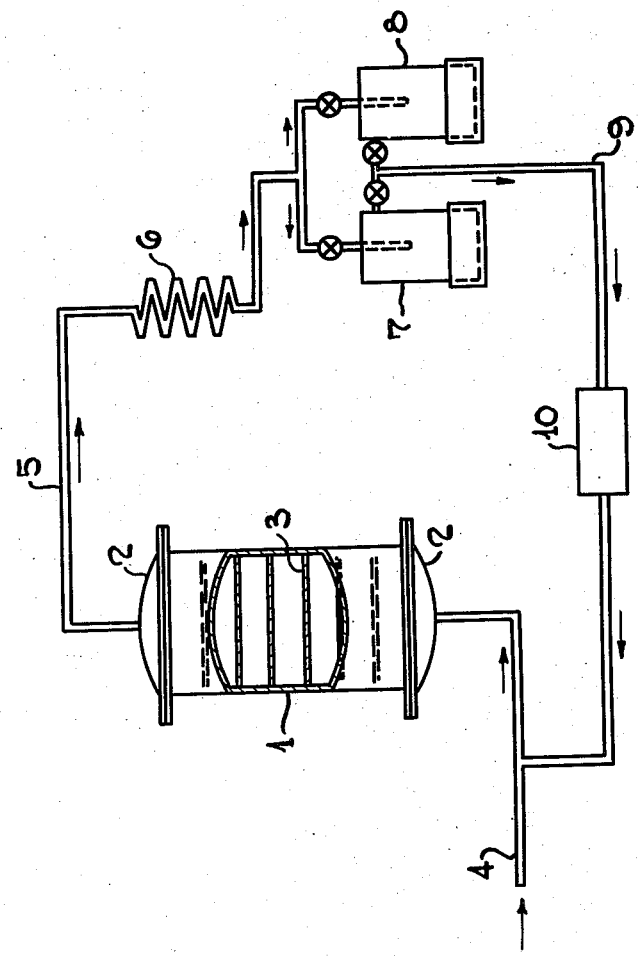
Raphael Rosen Inventor
By *Robert A. Lavender* Attorney

2,894,811
PROCESS FOR MAKING URANIUM HEXAFLUORIDE

Raphael Rosen, Elizabeth, N.J., assignor to the United States of America as represented by the United States Atomic Energy Commission Application September 13, 1944, Serial No. 553,923

6 Claims. (Cl. 23—14.5)

The present invention relates to the art of producing the highest fluoride of uranium, i.e. $UF_6$. The invention will be fully understood from the following description.

The drawing is a semi-diagrammatic view of an apparatus for carrying out the process.

The highest fluoride of uranium, in which the metal is present in its highest state of valence, is a volatile product, that is to say, the hexafluoride of uranium. Since the metal fluoride is volatile, it is highly desirable to produce this compound, for in that form it can be most easily purified. Heretofore, this compound has been prepared from the lower fluorides, in which the metal has a valence two below the maximum valence of the metal, by reaction with elemental fluorine. As an example, uranium tetrafluoride is used and elemental fluorine is added directly to it, producing uranium hexafluoride.

This reaction requires elementary fluorine which is costly and extremely difficult to handle. One of the chief advantages of the present improved process is that elementary fluorine is not employed but hydrogen fluoride is used instead. In the present process as a starting material, the highest chloride of the metal in question is employed and is treated with hydrogen fluoride which produces the fluoride of the metal and hydrogen chloride. Some $UF_4$ is generally formed, presumably by a side reaction.

Referring to the drawing, numeral 1 denotes a reaction vessel with removable heads 2. Within the vessel, the chloride of the metal is charged, for example $UCl_6$, in the form of lumps, generally indicated at 3. It is desirable that these lumps be supported on trays, screens, grids or the like, which are not shown, and disposed in such a manner that hydrogen fluoride entering by pipe 4 may pass through the reactor in intimate contact with the solid metal chloride, with which reaction is desired.

The hydrogen fluoride is preferably gaseous and the reactor is maintained at a temperature somewhat above the volatilization temperature of the higher fluoride, although below the decomposition temperature of the hexachloride. The temperature may vary somewhat but it is always sufficiently below the volatilization temperature of the hexachloride so that no difficulty is encountered in maintaining the reaction between these two temperatures. Uranium hexafluoride volatilizes at about 54° C., and the temperature should be kept below 100 to 150° C., so as not to decompose the hexachlorides. At these temperatures $UCl_6$ is not vaporized.

The reaction gas passes from the reactor through a line 5 to a cooler 6 and thence into one or the other of the two chilled jacketed receivers 7 and 8. The uncondensed fixed gas, consisting largely of HF and HCl, passes from the receivers by pipe 9 and may be recirculated through the reactor. If desired, a separator 10 may be employed for separating hydrogen chloride from the hydrogen fluoride, and in this manner the concentration of HF may be kept up. No particular type of separator is required and it may be effected either by liquefaction and distillation or by selective absorption of the HF on sodium fluoride or the like.

The reaction of the higher chloride with hydrogen fluoride proceeds at relatively low temperatures, even at room temperatures, and the reaction is quite rapid. If gaseous hydrogen fluoride is employed, it is desirable to operate at a temperature above the volatilization temperature of the higher fluoride produced, say above about 60° C., where uranium hexafluoride is the product, and below the decomposing temperature of the $UCl_6$, as stated above. In this manner the higher fluoride is continually removed from the reaction vessel 1 and recovered in the receivers as a product which requires little or no subsequent purification. If desired, lower reaction temperatures may be employed, that is to say below that at which the higher fluoride is volatilized and in such a process either liquid or gaseous hydrogen fluoride may be used. In such process, the higher fluoride remains in the reactor and is distilled from any residual chloride left in the reactor as a separate step. If the process is carried out under pressure, the product is removed as a liquid instead of as a solid.

In the present process, the reactants are kept completely dry as water reacts rapidly with the higher fluorides and it is important to provide drying means for all of the reactants employed and to prevent all access of moisture.

The higher fluoride is a very corrosive substance to various metals and many other commoner materials of construction, and care must be taken to employ construction materials to which it is substantially inert. Thus the pipes, reactors and other equipment may be made of or lined with nickel, copper, aluminum, magnesium or platinum, and reactor linings of carbon have proved useful.

The reaction disclosed herein has been found to progress with only small heat effects so that no difficulty of heating or cooling is encountered. It will be understood that the process as disclosed above is semi-continuous or batch and the reactor is periodically charged with the metal chloride, the product being alternately removed from one or the other of the two receivers. If desired, the process may be made fully continuous by employing processes in which the solid higher chloride is passed continuously through the apparatus as a moving bed or otherwise. One valuable means for accomplishing this process is the use of "fluid solid technique." In such processes the solid chloride is ground to a fine state of sub-division and suspended in a gaseous vehicle. In such condition it can be fed to the reaction vessel, flowing much as a liquid, and can be withdrawn and recirculated as desired. Finely divided solids are separated from the reaction gases in the usual manner and the higher fluoride is condensed from the gases by refrigeration or by absorption on some suitable agent.

As an example of the reaction, $UCl_6$ in pure form was placed in a nickel reactor with a platinum lining cooled on the outside by Dry Ice. HF, carefully dried, was passed through the tube and the temperature of the reactor was gradually allowed to rise by using the carbon dioxide bath. At about room temperature, there was evidence of reaction, i.e., evolution of heat, and HCl was found in the exit vapors. After several hours, when evolution of HCl had ceased, the product was distilled under vacuum of 6–8 mm. of Hg. and a distillate removed as a sublimed solid. This product was largely $UF_6$ and some $UF_4$ was present.

The above process is not to be limited by any particular method of carrying out the reaction or by any particular metal fluoride, but only by the following claims.

I claim:

1. An improved process for manufacturing uranium hexafluoride comprising reacting uranium hexachloride with hydrogen fluoride at a temperature below the decomposing temperature of uranium hexachloride and under substantially anhydrous conditions, and recovering the uranium hexafluoride.

2. The process according to claim 1 in which gaseous hydrogen fluoride is employed at a temperature between about room temperature and 150° C.

3. The process according to claim 1 in which gaseous hydrogen fluoride is reacted with the solid uranium hexachloride at a temperature above that at which uranium hexafluoride is volatilized, but below about 150° C., and the volatilized uranium hexafluoride is recovered from the reaction gases.

4. The process according to claim 1 in which liquid hydrogen fluoride is reacted with the uranium hexachloride and in which the uranium hexafluoride produced is subsequently distilled from the residual chloride.

5. An improved process for producing uranium hexafluoride comprising reacting uranium hexachloride with hydrogen fluoride at a temperature below about 150° C. under anhydrous conditions and recovering the uranium hexafluoride.

6. An improved process for manufacturing uranium hexafluoride which comprises reacting a chloride of uranium which is substantially uranium hexachloride with hydrogen fluoride at a temperature below the decomposing temperature of the chloride and under substantially anhydrous conditions and recovering the uranium hexafluoride.

References Cited in the file of this patent
UNITED STATES PATENTS

| | | |
|---|---|---|
| 2,567,145 | Carrigan | Sept. 4, 1951 |
| 2,638,406 | Tevebaugh et al. | May 12, 1953 |
| 2,768,872 | Klein et al. | Oct. 30, 1956 |

OTHER REFERENCES

Chem. Abstracts, vol. V, 1911, page 3772, Otto Ruff and Alfred Heinzelmann, Danzig Z. Anorg. Chem. 72, pages 63–84.

Mellor: "Comprehensive Treatise on Inorganic and Theoretical Chemistry," vol. 12, 1932, page 75.